(12) United States Patent
Nishida et al.

(10) Patent No.: US 6,755,046 B2
(45) Date of Patent: Jun. 29, 2004

(54) VEHICLE AIR CONDITIONER WITH HEAT PUMP REFRIGERANT CYCLE

(75) Inventors: Shin Nishida, Anjo (JP); Masaaki Kawakubo, Obu (JP); Kouji Matsunaga, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/404,730

(22) Filed: Apr. 1, 2003

(65) Prior Publication Data

US 2003/0182961 A1 Oct. 2, 2003

(30) Foreign Application Priority Data

Apr. 2, 2002 (JP) .................................. 2002-100324

(51) Int. Cl.⁷ .......................... F25B 13/00; F25B 29/00; B60H 1/32
(52) U.S. Cl. .......................... 62/324.1; 62/239; 62/244; 62/325
(58) Field of Search ................ 62/324.1–325, 62/239, 244

(56) References Cited

U.S. PATENT DOCUMENTS 5,355,689 A * 10/1994 Hara et al. ..................... 62/159
5,899,086 A * 5/1999 Noda et al. ..................... 62/244
6,237,357 B1 * 5/2001 Hirao et al. ..................... 62/325
6,550,265 B2 * 4/2003 Takeuchi et al. ............ 62/324.2

FOREIGN PATENT DOCUMENTS

JP 6-206438 7/1994
JP 11-13954 5/1999

* cited by examiner

Primary Examiner—William C. Doerrler
Assistant Examiner—Filip Zec
(74) Attorney, Agent, or Firm—Harness, Dickey & Pierce, PLC

(57) ABSTRACT

In a vehicle air conditioner with a heat pump refrigerant cycle, an interior heat exchanger of the refrigerant cycle is disposed in an air conditioning case to heat air in a heating operation and to cool air in a cooling operation. Further, a cooling heat exchanger for cooling air by evaporating the refrigerant is disposed so that a part of refrigerant circulating in the refrigerant cycle flows into the cooling heat exchanger at least in the heating operation. In addition, a decompression unit for decompressing refrigerant flowing to the cooling heat exchanger is disposed, and the decompression unit is opened even in the cooling operation. Accordingly, dehumidifying capacity of the air conditioner can be improved while the refrigerant cycle has a simple structure.

31 Claims, 11 Drawing Sheets

← COOLING
←--- HEATING

← COOLING
←---- HEATING

← COOLING
←---- HEATING

← COOLING
←--- HEATING

← COOLING
◄---- HEATING

VEHICLE AIR CONDITIONER WITH HEAT PUMP REFRIGERANT CYCLE

CROSS REFERENCE TO RELATED APPLICATION

This application is based on Japanese Patent Application No. 2002-100324 filed on Apr. 2, 2002, the disclosure of which is incorporated herein by reference.

BACKGROUND OF THE INVENTION

1. Field of the Invention

The present invention relates to an air conditioner with a heat pump refrigerant cycle. The air conditioner is suitably used for a vehicle.

2. Related Art

Generally, a heat pump refrigerant cycle is divided into a full heat pump system and a reversible heat pump system. In the full heat pump system, during a heating operation, air is firstly cooled in a cooling heat exchanger to a dew point so that moisture in the air is removed, and is heated by a heating heat exchanger disposed at a downstream air side of the cooling heat exchanger. On the other hand, in the reversible heat pump system, an interior heat exchanger and an exterior heat exchanger are provided, and a refrigerant flow in the interior heat exchanger and the exterior heat exchanger is reversed in the heating operation and a cooling operation. Specifically, by reversely changing the refrigerant flow, the interior heat exchanger cools air in the cooling operation, and heats air in the heating operation. However, in the reversible heat pump system, during the heating operation, air is not dehumidified in the interior heat exchanger, and a windshield of a vehicle is readily fogged.

Further, in a vehicle having a water-cooled engine, a heater core system using cooling water from the engine as a heating source is provided. In the heater core system, when temperature of cooling water of the engine is low, the interior heat exchanger of the heat pump system heats air to be blown into a passenger compartment. Thereafter, when the temperature of cooling water from the engine is sufficiently increased, the heat pump system is stopped, and air to be blown into the passenger compartment is heated by the heater core system using the cooling water as a heating source.

The heater core system may be simply combined with the full heat pump system. However, in this case, it is necessary to increase the sizes of the cooling heat exchanger and the heating heat exchanger of the full heat pump system, in order to obtain a sufficient air-conditioning capacity (cooling capacity or heating capacity). Further, in this system, refrigerant pipe structure becomes complex, and mounting performance of the air conditioner on the vehicle is deteriorated. On the other hand, the heater core system may be simply combined with the reversible heat pump system. However, in this case, when the temperature of the engine-cooling water is low in the heating operation, because the interior heat exchanger is used for heating air, air is not dehumidified.

SUMMARY OF THE INVENTION

In view of the above-described problems, it is an object of the present invention to provide an air conditioner with a new system structure.

It is another object of the present invention to provide an air conditioner that has a simple system structure while improving dehumidifying capacity of air.

According to the present invention, in an air conditioner for a compartment, a refrigerant cycle system includes a compressor for compressing and discharging refrigerant, an exterior heat exchanger for performing heat exchange with outside air outside the compartment, an interior heat exchanger for cooling and heating air to be blown into the compartment, a cooling heat exchanger in which the refrigerant flows for cooling air to be blown into the compartment, and a decompression device for decompressing the refrigerant flowing to the cooling heat exchanger. Further, the interior heat exchanger is disposed such that the refrigerant discharged from the compressor flows to the interior heat exchanger after passing through the exterior heat exchanger in a cooling operation for cooling the compartment, and the refrigerant discharged from the compressor flows to the exterior heat exchanger after passing through the interior heat exchanger in a heating operation for heating the compartment. Accordingly, in the heating operation, the interior heat exchanger heats air flowing through the air passage by radiating heat from the refrigerant, and the cooling heat exchanger cools air flowing through the air passage by evaporating the refrigerant. On the other hand, in the cooling operation, at least the interior heat exchanger cools air flowing through the air passage by evaporating the refrigerant. Accordingly, the air conditioner has an improved system structure of the refrigerant cycle.

In addition, in the air conditioner, the decompression device is opened even in the cooling operation. Therefore, in the cooling operation, both the cooling heat exchanger and the interior heat exchanger can be used for cooling air to be blown into the compartment. Therefore, it can restrict condensed water from being largely generated on the interior heat exchanger in the cooling operation, and it can effectively prevent a windshield from being fogged at a switching time from the cooling operation to the heating operation, when the air conditioner is used for a vehicle. Accordingly, dehumidifying capacity of air can be improved while the refrigerant cycle has a simple structure.

Here, the cooling heat exchanger can be disposed upstream from the interior heat exchanger in an air flowing direction. Alternatively, the cooling heat exchanger and the interior heat exchanger can be disposed in the air conditioning case, in parallel in the air flowing direction.

Preferably, the cooling heat exchanger and the interior heat exchanger are disposed such that at least a part of air after passing through the cooling heat exchanger passes through the interior heat exchanger. Therefore, in the air conditioner, air can be effectively dehumidified while it can restrict the temperature of air blown into the compartment from being greatly decreased.

Preferably, the cooling heat exchanger is coupled to the interior heat exchanger such that at least a part of refrigerant flowing out from the interior heat exchanger is introduced to the cooling heat exchanger. Alternatively, the cooling heat exchanger is coupled to the interior heat exchanger such that refrigerant flowing to the cooling heat exchanger is branched from the interior heat exchanger. Accordingly, refrigerant can be readily introduced into the cooling heat exchanger with a simple structure.

The refrigerant cycle of the air conditioner further includes an inner heat exchanger for performing a heat exchange between a high-pressure side refrigerant before being decompressed, and a low-pressure side refrigerant after being decompressed. Further, the inner heat exchanger has therein a first refrigerant passage through which the high-pressure side refrigerant flows, and a second refrigerant passage through which the low-pressure side refrigerant flows. In this case, the first refrigerant passage has a passage diameter that is substantially equal to a passage diameter of the second refrigerant passage. Alternatively, the first refrigerant passage has an equivalent passage diameter that is substantially equal to that of the second refrigerant passage. Therefore, even when refrigerant reversely flows through the inner heat exchanger, it can prevent heat-exchanging capacity of the inner heat exchanger from being greatly decreased.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Preferred embodiments of the present invention will be described hereinafter with reference to the accompanying drawings.

(First Embodiment)

Figure 1:
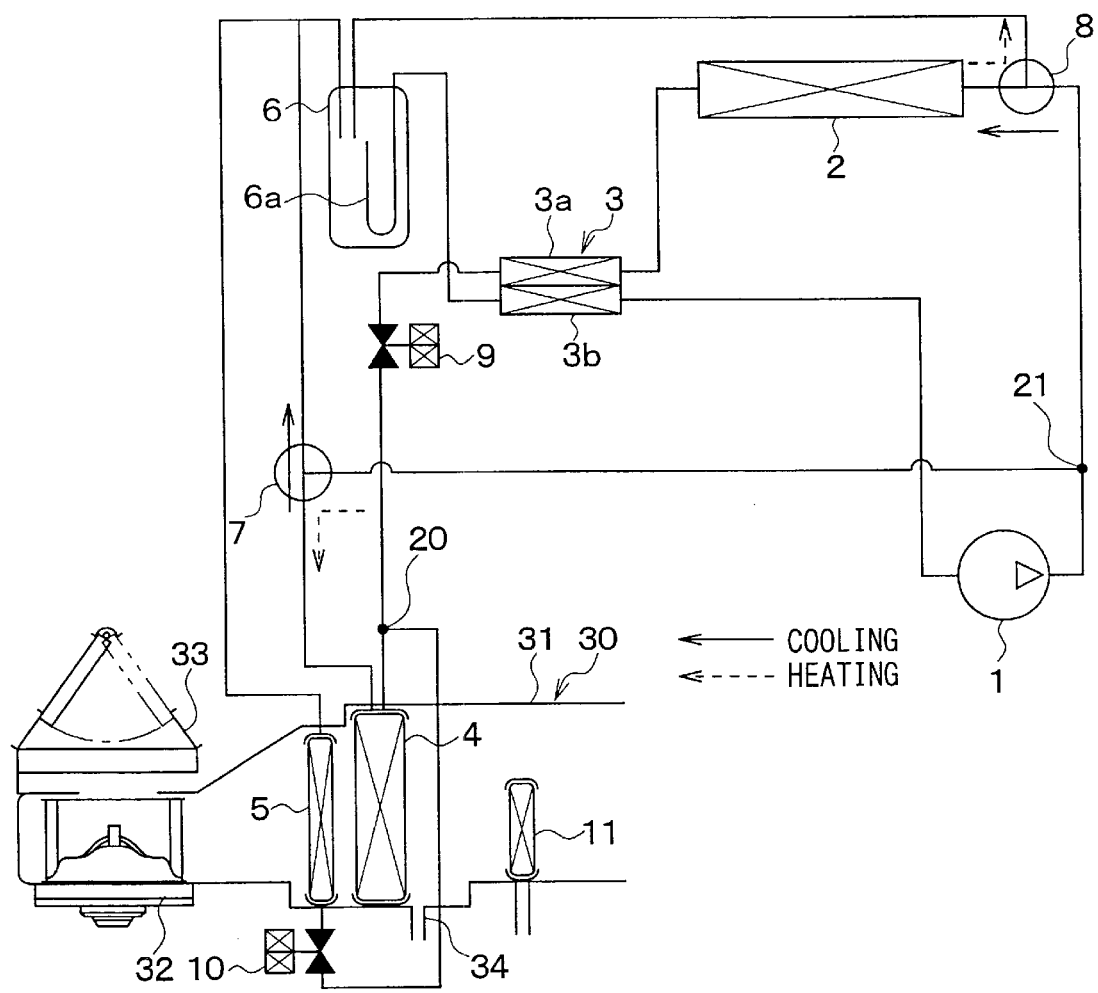
FIG. 1 is a schematic diagram showing an air conditioner with a heat pump refrigerant cycle, according to a first embodiment of the present invention.

In the first embodiment, an air conditioner of the present invention is typically used for a vehicle. As shown in FIG. 1, the air conditioner includes a vapor-compression heat pump refrigerant cycle. The refrigerant cycle includes a compressor 1, an exterior heat exchanger 2, an inner heat exchanger 3, an interior heat exchanger 4, a cooling heat exchanger 5 for decreasing the temperature of air, an accumulator 6, three-way valves 7 and 8, and valves 9 and 10. In the first embodiment, fluorocarbon (flon) is used as the refrigerant, for example. Therefore, in the vapor-compression refrigerant cycle, the refrigerant pressure at a high-pressure side, before being decompressed, is lower than the critical pressure of the refrigerant.

The exterior heat exchanger 2 is disposed to perform heat exchange between refrigerant and outside air outside a passenger compartment, and the interior heat exchanger 4 is disposed to perform heat exchange between refrigerant and air to be blown into the passenger compartment. A heater core 11 is disposed to heat air to be blown into the passenger compartment by using engine-cooling water (cooling water, hot water) as a heating source. The accumulator 6 is disposed to separate refrigerant into gas refrigerant and liquid refrigerant, and to store therein surplus refrigerant of the refrigerant cycle. Gas refrigerant separated in the accumulator 6 is supplied to a suction side of the compressor 1.

The inner heat exchanger 3 is disposed to perform heat exchange between high-pressure side refrigerant before being decompressed and low-pressure side refrigerant after being decompressed in the vapor-compression refrigerant cycle. Specifically, the inner heat exchanger 3 includes a first refrigerant passage 3a through which high-pressure side refrigerant flows, and a second refrigerant passage 3b through which low-pressure side refrigerant flows. In the first embodiment, the first and second refrigerant passages 3a, 3b are set to have the same equivalent passage diameter. Hear, the equivalent passage diameter is a diameter when the passage sectional area is converted to a circuit having the same area as the passage sectional area. Further, in the inner heat exchanger 3, a passage sectional area of the first refrigerant passage 3a can be set to be equal to that of the second refrigerant passage 3b.

The valve 9 is used as an expansion valve, so that refrigerant is decompressed in the valve 9. In the first embodiment, even in a heating operation for heating the passenger compartment, the valve 9 decompresses refrigerant flowing from the interior heat exchanger 4. A refrigerant branch portion 20 is provided in a refrigerant passage for connecting the interior heat exchanger 4 and the valve 9, so that refrigerant is branched at the refrigerant branch portion 20 to be introduced to the cooling heat exchanger 5. The valve 10 is disposed in a refrigerant passage connecting the refrigerant branch portion 20 and the cooling heat exchanger 5, to close the refrigerant passage or to decompress the refrigerant flowing through the refrigerant passage. That is, the valve 10 is disposed to switch one of a case where the refrigerant passage between the branch portion 20 and the cooling heat exchanger 5 is closed, and a case where a decompressing degree of refrigerant flowing through the refrigerant passage from the branch portion 20 to the cooling heat exchanger 5 is adjusted.

In the first embodiment, a refrigerant outlet side of the cooling heat exchanger 5 is connected to a refrigerant inlet side of an accumulator 6 by the three-way valve 7, so that refrigerant accurately flows from the branch portion 20 to the cooling heat exchanger 5.

An air conditioning unit 30 of the air conditioner is disposed in the passenger compartment of the vehicle. The air conditioning unit 30 includes the cooling heat exchanger 5, an air-conditioning case 31 for accommodating the interior heat exchanger 4 and a heater core 11, a blower 32 for blowing air into the air conditioning case 31, and an inside/outside air switching casing 33 from which air is selectively introduced to the blower 32. The inside/outside air switching case 33 is provided to switch one of an inside air introduction mode where inside air inside the passenger compartment is introduced, and an outside air introduction mode where outside air outside the passenger compartment is introduced.

The cooling heat exchanger 5 is disposed to cool and dehumidify air, the interior heat exchanger 4 is disposed at a downstream air side of the cooling heat exchanger 5, and the heat core 11 is disposed at a downstream air side of the interior heat exchanger 4. Therefore, at least a part of air after passing through the cooling heat exchanger 5 passes through the interior heat exchanger 4.

The arrangement position of the cooling heat exchanger 5 for cooling air can be changed, only when the cooling heat exchanger 5 is disposed upstream from the interior heat exchanger 4 in an air-flowing direction. For example, the cooling heat exchanger 5 can be disposed immediately upstream from the interior heat exchanger 4 in the air-flowing direction, or can be disposed in an air duct connecting the blower 32 and the air-conditioning case 31, or can be disposed at an air introduction side of the blower 32.

Next, operation of the air conditioner according to the first embodiment will be now described.

1. Heating Operation

When the heating operation is set, refrigerant discharged from the compressor 1 flows through the refrigerant branch portion 21, the three way valve 7 and the interior heat exchanger 4, in this order, and flows from the interior heat exchanger 4 to the refrigerant branch portion 20. A part of refrigerant branched at the refrigerant branch portion 20 flows through the valve 9, the first refrigerant passage 3a in the inner heat exchanger 3, the exterior heat exchanger 2 and the three-way valve 8, and reaches to the accumulator 6. On the other hand, the other part of refrigerant branched at the refrigerant branch portion 20 flows through the valve 10 and the cooling heat exchanger 5, and flows from the cooling heat exchanger 5 to the accumulator 6. The two flows of refrigerant branched at the refrigerant branch portion 20 are joined in the accumulator 6.

Gas refrigerant in the accumulator 6 flows through the second refrigerant passage 3b of the inner heat exchanger 3, and returns to the compressor 1. In the heating operation, both the refrigerant flowing through the first refrigerant passage 3a and the refrigerant flowing through the second refrigerant passage 3b of the inner heat exchanger 3 are low-pressure side refrigerants after being decompressed, and a temperature difference therebetween is small. Therefore, in the heating operation, heat exchange between refrigerants is not largely caused in the inner heat exchanger 3.

In the heating operation, because high-pressure and high-temperature refrigerant discharged from the compressor 1 flows into the interior heat exchanger 4 through the refrigerant branch portion 21 and the three-way valve 21, air blown into the passenger compartment can be heated by the interior heat exchanger 4. That is, because the interior heat exchanger 4 is disposed downstream from the cooling heat exchanger 5 in the air flowing direction, air cooled and dehumidified in the cooling heat exchanger 5 is heated by the interior heat exchanger 4. Then, the refrigerant flowing from the interior heat exchanger 4 is branched at the refrigerant branch portion 20. A part of refrigerant branched at the refrigerant branch portion 20 is decompressed by the valve 9 to be in a gas-liquid two-phase state, and is evaporated by absorbing heat from an outside in the exterior heat exchanger 2. On the other hand, the other parts of refrigerant branched at the refrigerant branch portion 20 is decompressed in the valve 10 (throttle), and is evaporated in the cooling heat exchanger 5 by absorbing heat from air to be blown into the passenger compartment. Therefore, air passing through the cooling heat exchanger 5 can be cooled to the dew point. Thus, moisture contained in air can be condensed on the cooling heat exchanger 5, and the condensed water is discharged to an outside of the air conditioning case 31 from a water discharge port 34.

In the first embodiment, the cooling heat exchanger 5 is disposed for cooling air to the dew point so that the air to be blown into the passenger compartment is dehumidified. Therefore, it is unnecessary to set the cooling capacity of the cooling heat exchanger 5 to be larger, as compared with a heat exchanger for performing cooling operation. That is, the cooling capacity of the cooling heat exchanger 5 can be set smaller as compared with the interior heat exchanger 4.

Accordingly, in the first embodiment, a thickness dimension of the cooling heat exchanger 5 in the air flowing direction can be set smaller than that of the interior heat exchanger 4, and a front surface (air introduction surface) of the cooling heat exchanger 5 in the air flowing direction can be set smaller than that of the interior heat exchanger 4. Further, each of the cooling heat exchanger 5 and the interior heat exchanger 4 includes plural tubes through which refrigerant flows, and plural corrugated fins each of which is disposed between adjacent tubes. In this case, a fin pitch of the corrugated fins in the cooling heat exchanger 5 can be set larger than that in the interior heat exchanger 4, and a fin height of the corrugated fins in the cooling heat exchanger 5 can be set larger than that in the interior heat exchanger 4. Therefore, air-flowing resistance in the cooling heat exchanger 5 can be reduced, and it can restrict the air flowing amount from being decreased due to the arrangement of the cooling heat exchanger.

2. Cooling Operation

When the cooling operation is set, refrigerant discharged from the compressor 1 flows through the refrigerant branch portion 21, the three-way valve 8, the exterior heat exchanger 2, the first refrigerant passage 3a of the inner heat exchanger 3 and the valve 9, and reaches to the refrigerant branch portion 20. A part of refrigerant branched at the refrigerant branch portion 20, flows through the interior heat exchanger 4 and the three-way valve 7, and flows into the accumulator 6. On the other hand, the other part of refrigerant branched at the refrigerant branch portion 20, flows through the valve 10 (throttle) and the cooling heat exchanger 5, and flows into the accumulator 6. The two flows of refrigerant branched at the refrigerant branch portion 20 are joined in the accumulator 6, and refrigerant is separated into gas refrigerant and liquid refrigerant in the accumulator 6. Gas refrigerant flowing from the gas refrigerant outlet 6a passes through the second refrigerant passage 3b of the inner heat exchanger 3, and is sucked into the compressor 1.

In the cooling operation, high-pressure side refrigerant from the compressor 1 is cooled by outside air in the exterior heat exchanger 2, and is further cooled in the inner heat exchanger 3 by low-pressure side refrigerant. Thereafter, the cooled high-pressure side refrigerant is decompressed in the valve 9, and flows to the refrigerant branch portion 20. Refrigerant is branched at the refrigerant branch portion 20 to flow into the interior heat exchanger 4 and the cooling heat exchanger 5. Refrigerant is evaporated in the interior heat exchanger 4 and the cooling heat exchanger 5 by absorbing heat from air to be blown into the passenger compartment, so that the air to be blown into the passenger compartment is cooled.

When the heating operation is switched from the cooling operation, condensed water generated on the surface of the interior heat exchanger 4 in the cooling operation may be evaporated in the heating operation, and the windshield may be fogged. However, according to the first embodiment, in the cooling operation, the valve 10 is opened so that air is cooled and dehumidified in the cooling heat exchanger 5. Therefore, almost of moisture in the air is condensed in the cooling heat exchanger 5, and condensed water is not largely generated on the surface of the interior heat exchanger 4. Accordingly, it can prevent the windshield from being fogged at the switching time from the cooling operation to the heating operation.

In the first embodiment, when the heating operation is set, air dehumidified and cooled by the cooling heat exchanger 5 can be heated by the interior heat exchanger 4 and the heater core 11, in accordance with a necessary heating capacity and the operation condition in the heat pump refrigerant cycle.

In the air conditioner of the first embodiment, the dehumidifying capacity of air can be effectively improved while the system having a simple structure. Further, because the size and the capacity of the cooling heat exchanger 5 can be set smaller than that of the interior heat exchanger 4, the cooling heat exchanger 5 can be readily mounted on the vehicle. Further, because the equivalent passage diameters of the first and second refrigerant passages 3a, 3b are set to be substantially equal, it can restrict the heat-exchanging capacity of the inner heat exchanger 3 from being greatly lowered when the refrigerant flows reversibly.

(Second Embodiment)

Figure 2:
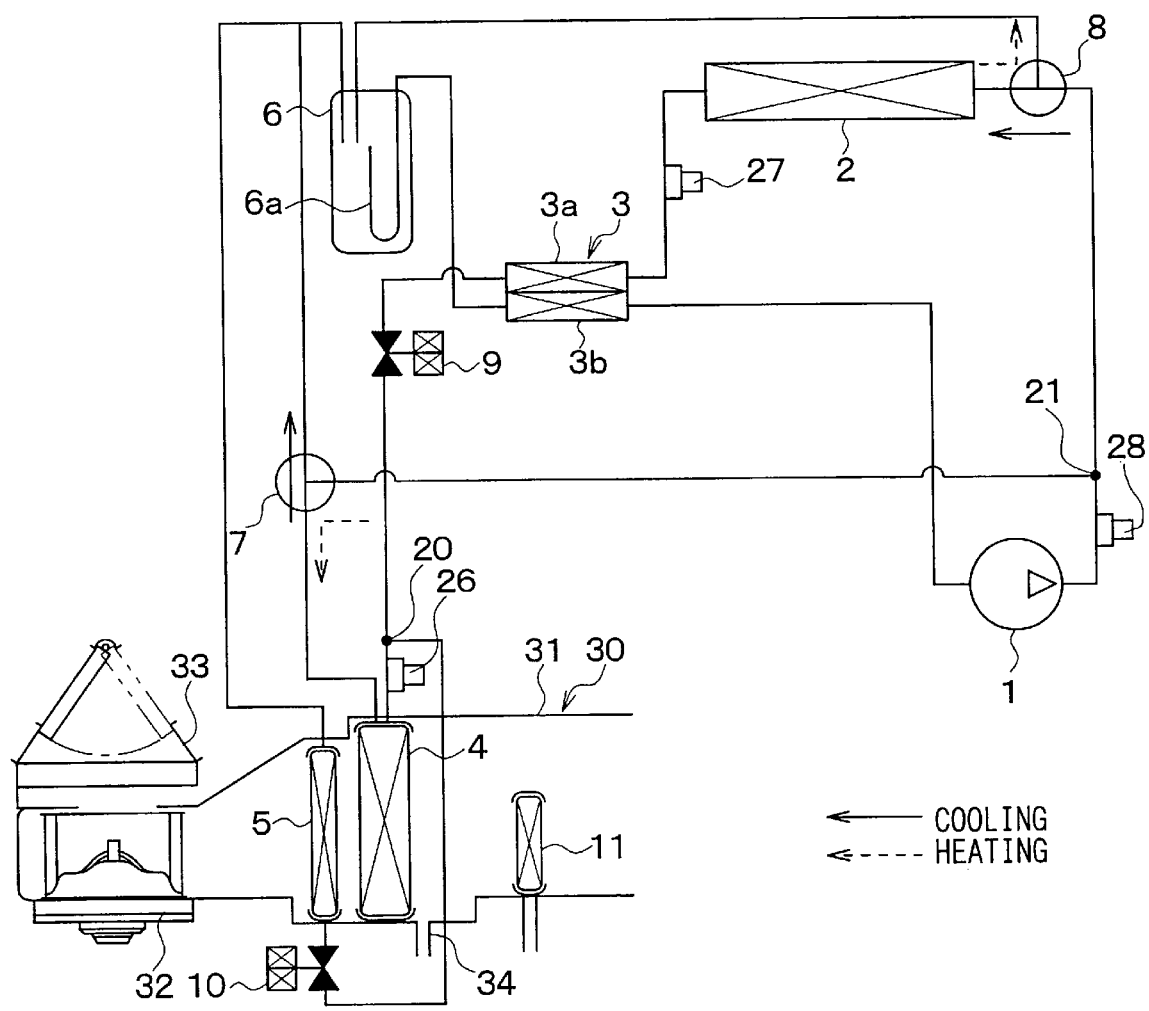
FIG. 2 is a schematic diagram showing an air conditioner with a heat pump refrigerant cycle, according to a second embodiment of the present invention.
Figure 3:
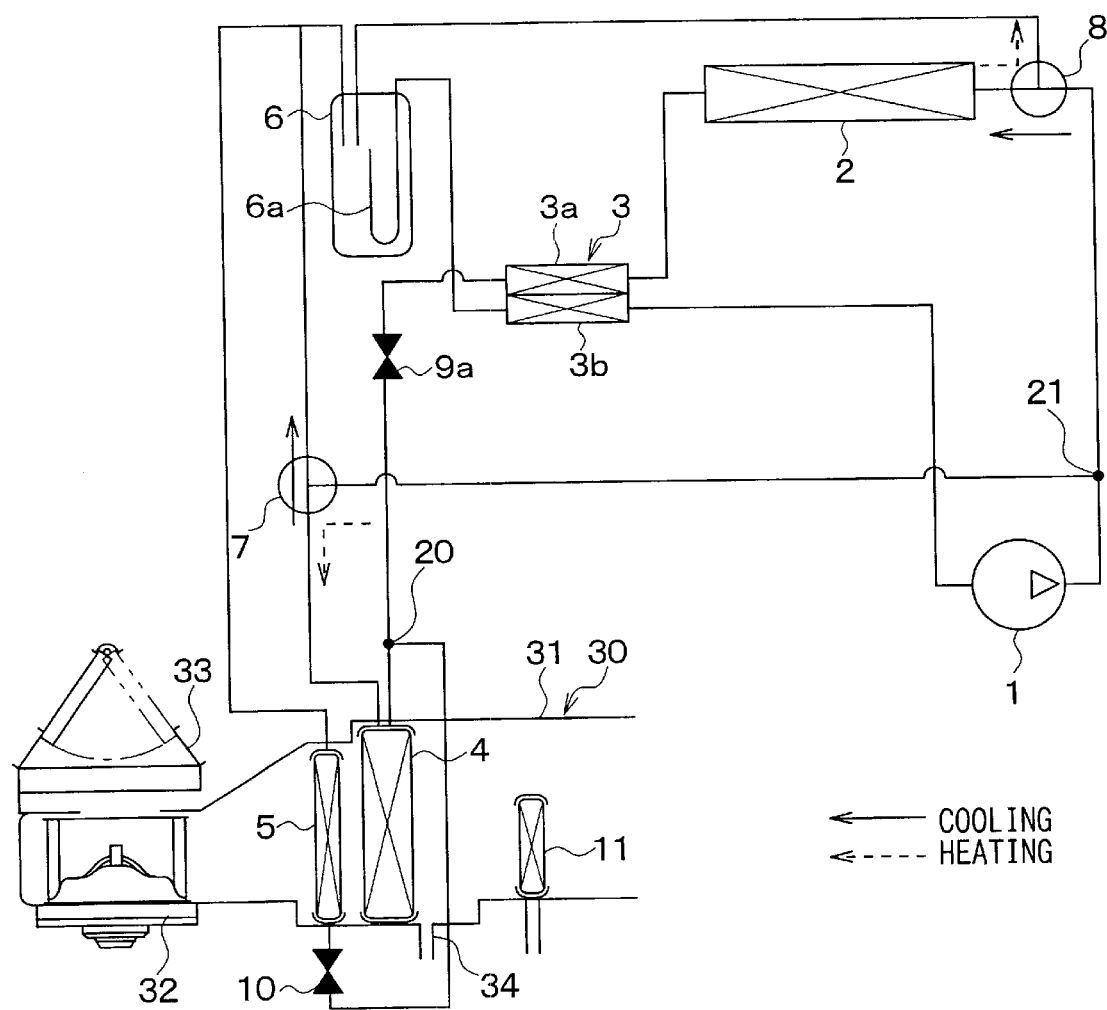
FIG. 3 is a schematic diagram showing an air conditioner with a heat pump refrigerant cycle, according to a third embodiment of the present invention.
Figure 4:
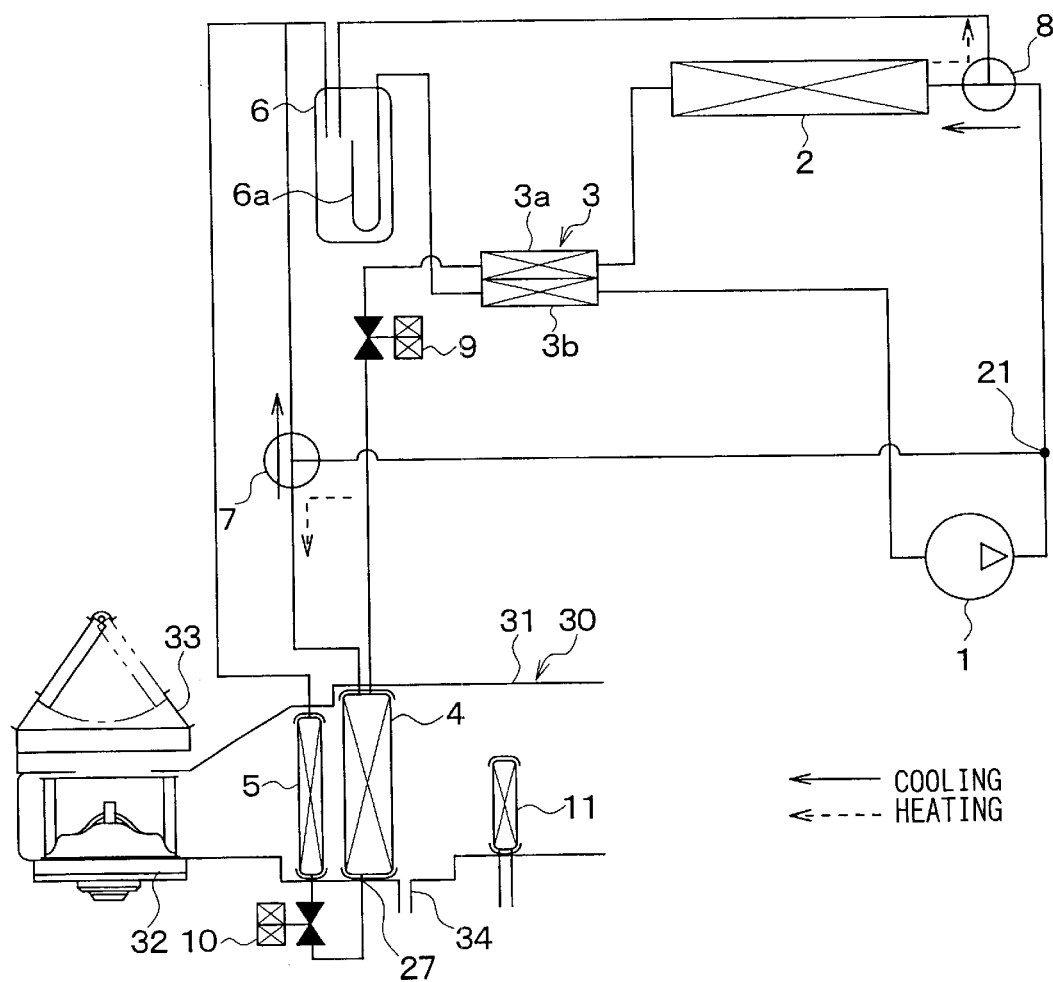
FIG. 4 is a schematic diagram showing an air conditioner with a heat pump refrigerant cycle, according to a fourth embodiment of the present invention.

In the second embodiment, the present invention is typically applied to a vapor-compression heat pump refrigerant cycle system where the pressure of refrigerant discharged from the compressor 1 is equal to or higher than the critical pressure. For example, carbon dioxide is used as the refrigerant. Next, operation of an air conditioner according to the second embodiment will be now described with reference to FIG. 2.

1. Heating Operation

In the heating operation, the refrigerant flow is similar to that of the above-described first embodiment. However, in the second embodiment, the pressure of the high-pressure side refrigerant is controlled in accordance with the temperature of the high-pressure side refrigerant, in order to improve operation efficiency (performance of coefficient) in a super-critical refrigerant cycle system where the refrigerant pressure at the high-pressure side becomes equal to or higher than the critical pressure of the refrigerant.

According to the second embodiment, in the heating operation where the interior heat exchanger 4 is used as a high-pressure side heat exchanger for radiating heat, the temperature of refrigerant flowing out from the interior heat exchanger 4 is detected by a temperature detecting unit 26, and a target refrigerant pressure at a high pressure side is determined based on the temperature detected by the temperature detecting unit 26, and a throttle opening degree of the valve 9 is controlled so that a high-pressure side refrigerant pressure detected by a pressure detecting unit 28 becomes the target refrigerant pressure.

In the second embodiment, the valve 10 can be used as a variable control valve for adjusting a refrigerant flowing amount by adjusting its opening degree in accordance with a necessary dehumidifying amount, or can be used as a switching valve that has a fixed opening degree when being opened. In this case, the pressure of the high-pressure side refrigerant is controlled only by the valve 9, and the refrigerant amount flowing through the cooling heat exchanger 5 is controlled by the valve 10.

2. Cooling Operation

The refrigerant flow in the cooling operation is similar to that in the above-described first embodiment. However, similarly to the heating operation, the pressure of the high-pressure side refrigerant is controlled based on the temperature of the high-pressure side refrigerant. Specifically, the temperature of refrigerant flowing from the exterior heat exchanger 2, which is a high-pressure side heat exchanger in the cooling operation, is detected by a temperature detecting unit 27, and a target refrigerant pressure at the high-pressure side is determined in accordance with the refrigerant temperature detected by the temperature detecting unit 27. Further, the opening degree of the valve 9 is controlled so that the refrigerant pressure detected by the pressure detecting unit 28 becomes the target refrigerant pressure. That is, the valve 9 is an electrical control valve that controls the refrigerant pressure at the high-pressure side based on an electrical signal of the high-pressure side refrigerant temperature. Further, the valve 10 is opened in the cooling operation so that refrigerant flows through the cooling heat exchanger 5 in the cooling operation.

In the second embodiment, the other parts are similar to those of the above-described first embodiment, and the advantage similar to the first embodiment can be obtained.

(Third Embodiment)

In the above-described second embodiment, the refrigerant temperature at the high-pressure side is detected as an electrical signal, and the refrigerant pressure at the high-pressure side is controlled by the refrigerant temperature at the high-pressure side. However, in the third embodiment, a mechanical control valve 9a (expansion valve) is used so that the refrigerant pressure at the high pressure side is controlled based on the refrigerant temperature at the high pressure side.

Next, operation of an air conditioner with refrigerant cycle system according to the third embodiment will be now described.

1. Heating Operation

In the heating operation, the refrigerant flow is similar to that in the above-described first embodiment. In the third embodiment, the valve 9a has therein a temperature detecting portion for detecting a refrigerant temperature. In the valve 9a, the detected refrigerant temperature is converted to a mechanical operation, so that a throttle degree of the valve 9a is controlled. On the other hand, similarly to the above-described second embodiment, the valve 10 can be used as a variable control valve for adjusting a refrigerant flowing amount by adjusting its opening degree in accordance with a necessary dehumidifying amount, or can be used as a switching valve that has a fixed opening degree when being opened. In this case, the pressure of the high-pressure side refrigerant is controlled by the valve 9, and the refrigerant amount flowing through the cooling heat exchanger 5 is controlled by the valve 10.

2. Cooling Operation

The refrigerant flow in the cooling operation of the third embodiment is similar to that in the above-described first embodiment. In the third embodiment, the refrigerant temperature is detected by the temperature detection portion provided in the valve 9a, the detected refrigerant temperature is converted to a mechanical operation, and the opening degree (throttle degree) of the valve 9a is controlled. In the cooling operation, the valve 10 is opened so that refrigerant flows through the cooling heat exchanger 5.

In the third embodiment, the other parts are similar to those of the above-described first embodiment, and the advantage similar to the first embodiment can be obtained.

(Fourth Embodiment)

In the above-described embodiments, the refrigerant branch portion 20 is provided for introducing refrigerant to the cooling heat exchanger 5. However, in the fourth embodiment, the branch portion 20 is not provided. That is, a part of refrigerant flowing into the interior heat exchanger 4 is introduced to the cooling heat exchanger 5 from a refrigerant introduction portion 27, and the valve 10 is disposed to decompress refrigerant from the refrigerant introduction portion 27. The refrigerant introduction portion 27 is provided in the interior heat exchanger 4.

In the fourth embodiment, the other parts are similar to those of the above-described first embodiment, and the advantage similar to the first embodiment can be obtained.

(Fifth Embodiment)

Figure 5:
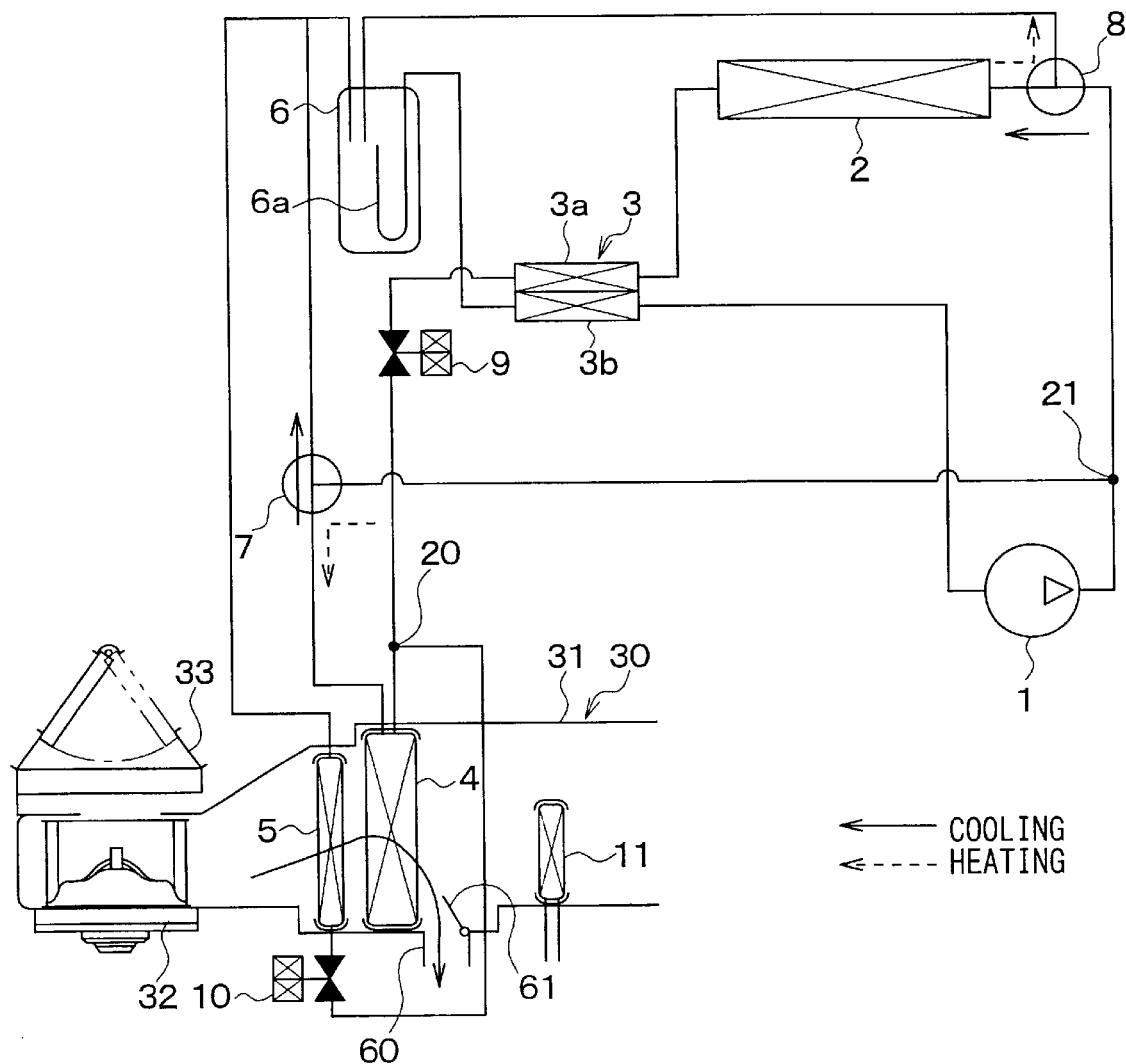
FIG. 5 is a schematic diagram showing an air conditioner with a heat pump refrigerant cycle, according to a fifth embodiment of the present invention.

In the fifth embodiment, as shown in FIG. 5, a discharge passage 60 communicating with the outside is provided in the air conditioning case 31 at a position immediately downstream from the interior heat exchanger 4, and a switching door (purge door) 61 is provided for opening and closing the discharge passage 60. When the heating operation is switched from the cooling operation, the switching door 61 opens the communication passage 60 so that air passing through the interior heat exchanger 4 is discharged to the outside of the air conditioning case 31. Therefore, a large amount of moisture evaporated on the interior heat exchanger 4 can be effectively discharged to the outside. Accordingly, even when the operation mode is switched from the cooling operation to the heating operation, it can prevent the windshield from being fogged.

In the fifth embodiment, the other parts are similar to those of the above-described first embodiment, and the advantage similar to the first embodiment can be obtained.

(Sixth Embodiment)

In the above-described embodiments, refrigerant is decompressed in a decompression unit such as an expansion valve and a fixed throttle in which refrigerant is decompressed in iso-enthalpy. However, in the sixth embodiment, an ejector 25 is disposed for decompressing refrigerant. In a refrigerant cycle system having the ejector 25, while refrigerant is decompressed in the ejector 25, the enthalpy of the refrigerant is converted to a pressure energy.

Figure 6:
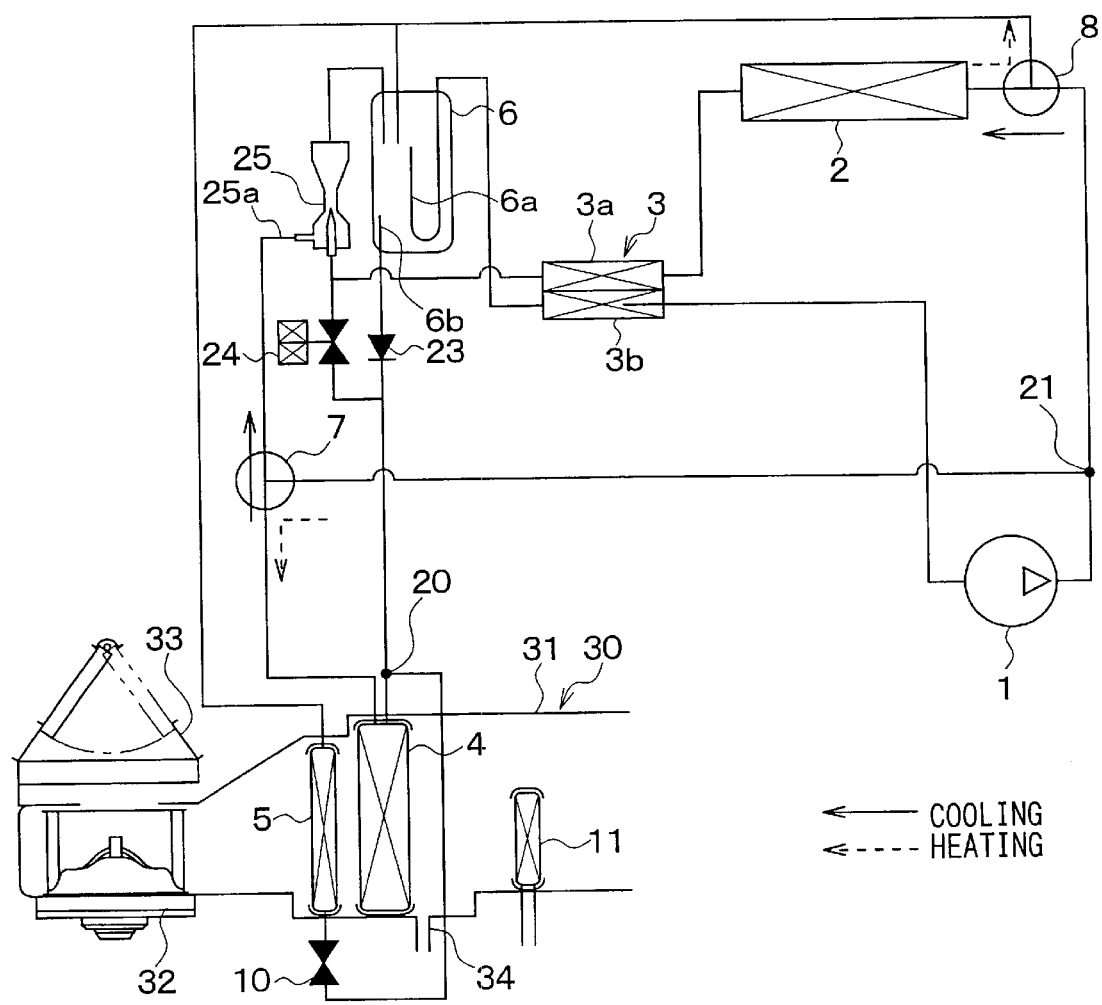
FIG. 6 is a schematic diagram showing an air conditioner with a heat pump refrigerant cycle, according to a sixth embodiment of the present invention.

Next, operation of the sixth embodiment will be now described with reference to FIG. 6.

1. Heating Operation

When the heating operation is set, refrigerant discharged from the compressor 1 flows through the refrigerant branch portion 21, the three-way valve 7 and the interior heat exchanger 4, and flows from the interior heat exchanger 4 to the refrigerant branch portion 20. A part of refrigerant branched at the refrigerant branch portion 20 flows through a valve 24 (throttle), the first refrigerant passage 3a, the exterior heat exchanger 2 and the three-way valve 8, and flows into the accumulator 6. On the other hand, the other part of refrigerant branched at the refrigerant branch portion 20 flows through the valve 10 (throttle) and the cooling heat exchanger 5, and flows into the accumulator 6.

The two flows of the refrigerants branched at the refrigerant branch portions 20 are joined in the accumulator 6, and refrigerant is separated into gas refrigerant and liquid refrigerant in the accumulator 6. Then, gas refrigerant in the accumulator 6 passes through the second refrigerant passage 3b, and is sucked into the compressor 1. In the heating operation, each of refrigerant passing through the first refrigerant passage 3a and refrigerant passing through the second refrigerant passage 3b is the refrigerant after being decompressed. Therefore, a temperature difference between the refrigerant in the first refrigerant passage 3a and the refrigerant in the second refrigerant passage 3b is a little, and heat exchange therebetween is almost not caused. In the heating operation, the refrigerant is decompressed using the valves 10, 24, without using the ejector 25.

In the heating operation, because high-pressure high-temperature refrigerant discharged from the compressor 1 flows into the interior heat exchanger 4, air passing through the interior heat exchanger 4 is heated. A part of refrigerant cooled in the interior heat exchanger 4 is decompressed by the valve 10 (throttle) to be decompressed, and flows into the cooling heat exchanger 5. In the cooling heat exchanger 5, refrigerant is evaporated by absorbing heat from air passing through the cooling heat exchanger 4, so that air is cooled and dehumidified in the cooling heat exchanger 4. The other part of refrigerant cooled in the interior heat exchanger 4 is decompressed in the valve 24 (throttle), and flows into the exterior heat exchanger 2 through the first refrigerant passage 3a of the inner heat exchanger 3, so that refrigerant is evaporated in the exterior heat exchanger 2 by absorbing heat from the outside air. Thereafter, refrigerant flowing from the exterior heat exchanger 2 flows into the accumulator 6.

Accordingly, in the heating operation, advantage similar to the first embodiment can be obtained.

2. Cooling Operation

When the cooling operation is set, high-temperature high-pressure refrigerant discharged from the compressor 1 flows through the refrigerant branch portion 21 and the three-way valve 8, and flows into the exterior heat exchanger 2 to be cooled by outside air in the exterior heat exchanger 2.

Refrigerant cooled by the exterior heat exchanger 2 is cooled by low-pressure side refrigerant in the inner heat exchanger 3, and flows into the ejector 25. Therefore, refrigerant is decompressed in a nozzle of the ejector 25 while refrigerant evaporated in the interior heat exchanger 4 is sucked into the ejector 25 to be mixed with the refrigerant jetted from the nozzle of the ejector 25. The refrigerant discharged from the ejector 25 flows into the accumulator 6.

In this case, gas refrigerant in the accumulator 6 is sucked into the compressor 1 through the second refrigerant passage 3b of the inner heat exchanger 3, and liquid refrigerant in the accumulator 6 flows into the interior heat exchanger 4 from a liquid refrigerant outlet 6b through a check valve 23 and the refrigerant branch portion 20. Therefore, refrigerant is evaporated in the interior heat exchanger 4 by absorbing heat from air passing through the interior heat exchanger 4, so that air to be blown into the passenger compartment is cooled. Gas refrigerant evaporated in the interior heat exchanger 4 passes through the three-way valve 7, is sucked into the ejector 25 from a returning portion 25a, and flows into the accumulator 6 with the refrigerant jetted from the nozzle of the ejector 25.

In the cooling operation, the refrigerant pressure at a refrigerant inlet side of the cooling heat exchanger 4 and the refrigerant pressure at a refrigerant outlet side of the cooling heat exchanger 4 are the same as the pressure in the accumulator 6. Therefore, even when the valve 10 is the fixed throttle, refrigerant does not flow into the cooling heat exchanger 5 in the cooling operation.

Accordingly, in the sixth embodiment, it can prevent air from being super-cooled, and it can prevent the interior heat exchanger 4 from being frosted in the cooling operation. In the sixth embodiment, even when a fixed throttle having a simple structure is used as the valve 10, it can effectively prevent the interior heat exchanger 4 from being frosted in the cooling operation. Further, a variable throttle can be used as the valve 4. In this case, by controlling the opening degree of the valve 10 continuously or in stepwise, a dehumidifying amount of air in the heating operation can be effectively controlled.

(Seventh Embodiment)

Figure 7:
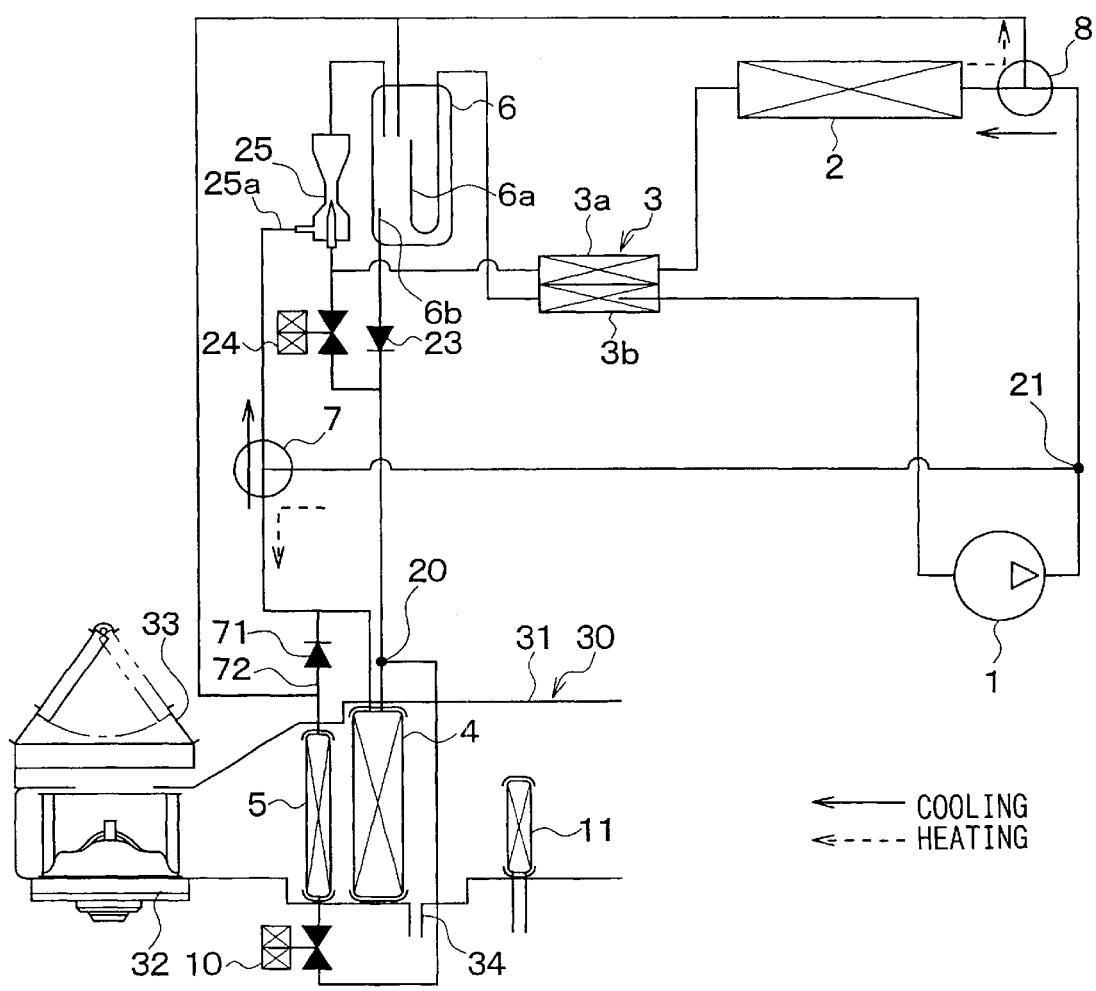
FIG. 7 is a schematic diagram showing an air conditioner with a heat pump refrigerant cycle, according to a seventh embodiment of the present invention.

The seventh embodiment is a modification of the above-described sixth embodiment. Specifically, in the seventh embodiment, as shown in FIG. 7, a refrigerant passage 72 is provided for connecting the refrigerant outlet side of the cooling heat exchanger 5 and the returning portion 25a of the ejector 25, and a check valve 71 is provided in the refrigerant passage 72. The check valve 71 is disposed so that refrigerant only flows from the refrigerant outlet side of the cooling heat exchanger 5 to the returning portion 25a of the ejector 25. Therefore, even in the cooling operation, refrigerant flows into the cooling heat exchanger 5, and cooling capacity can be also obtained in the cooling heat exchanger 5. In the seventh embodiment, the refrigerant flow in the heating operation is similar to that of the above-described sixth embodiment.

Next, the cooling operation of the seventh embodiment will be now described.

When the cooling operation is set, high-temperature high-pressure refrigerant discharged from the compressor 1 flows through the refrigerant branch portion 21 and the three-way valve 8, and flows into the exterior heat exchanger 2 to be cooled by outside air in the exterior heat exchanger 2.

Refrigerant cooled by the exterior heat exchanger 2 is further cooled by low-pressure side refrigerant in the inner heat exchanger 3, and flows into the ejector 25. Therefore, refrigerant is decompressed in the nozzle of the ejector 25 while refrigerant evaporated in the interior heat exchanger 4 and the cooling heat exchanger 5 is sucked into the ejector 25 to be mixed with the refrigerant jetted from the nozzle of the ejector 25. The refrigerant discharged from the ejector 25 flows into the accumulator 6.

In this case, gas refrigerant in the accumulator 6 is sucked into the compressor 1 through the second refrigerant passage 3b of the inner heat exchanger 3, and liquid refrigerant in the accumulator 6 flows into the interior heat exchanger 4 from the liquid refrigerant outlet 6b through the check valve 23 and the refrigerant branch portion 20. Therefore, refrigerant is evaporated in the interior heat exchanger 4 by absorbing heat from air passing through the interior heat exchanger 4, so that air to be blown into the passenger compartment is cooled. Gas refrigerant evaporated in the interior heat exchanger 4 passes through the three-way valve 7, is sucked into the ejector 25 from the returning portion 25a of the ejector 25, and flows into the accumulator 6 with the refrigerant jetted from the nozzle of the ejector 25. On the other hand, a part of refrigerant branched at the refrigerant branch portion 20 flows into the cooling heat exchanger 5, and is evaporated by absorbing heat from air passing through the cooling heat exchanger 5. The evaporated refrigerant from the cooling heat exchanger 5 flows through the refrigerant pipe 72, and is sucked into the ejector 25 from the returning portion 25a to be mixed with the refrigerant jetted from the nozzle of the ejector 25.

In the seventh embodiment, because the refrigerant pressure in the cooling heat exchanger 5 is approximately equal to the refrigerant pressure at the returning portion 25a, refrigerant can be evaporated in the cooling heat exchanger 5 even when refrigerant is not decompressed in the valve 10. Therefore, a switching valve having a simple structure, only for opening and closing a refrigerant passage can be used as the valve 10.

(Eighth Embodiment)

Figure 8:
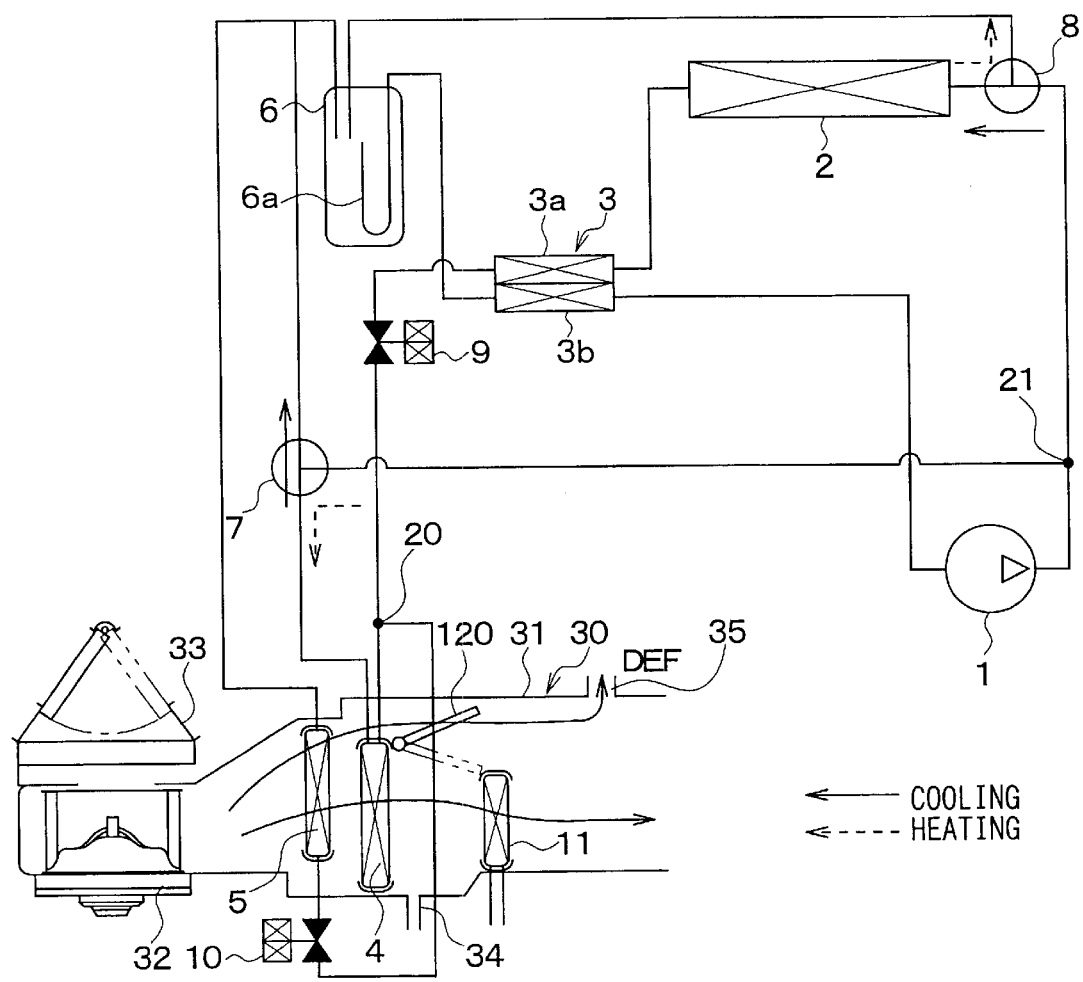
FIG. 8 is a schematic diagram showing an air conditioner with a heat pump refrigerant cycle, according to an eighth embodiment of the present invention.

In the eighth embodiment, as shown in FIG. 8, air passing through the cooling heat exchanger 5 is guided to readily flow into a defroster opening 35, at least in the heating operation. The defroster opening 35 is provided in the air conditioning case 31, so that air is blown toward an inner surface of the windshield through the defroster opening 35. Generally, the defroster opening 35 is coupled to a defroster outlet through a defroster duct. Further, the interior heat exchanger 4 is disposed in the air conditioning case 31 to form a bypass passage through which air passing through the cooling heat exchanger 5 bypasses the interior heat exchanger 4, and an air guiding door 120 is disposed in the air conditioning case 31 for guiding air from the cooling heat exchanger 5 toward the defroster opening 35.

When the operation mode is switched from the cooling operation to the heating operation, the air guiding door 120 is operated to the chain line position, so that air after passing through the cooling heat exchanger 5 can be readily introduced into the defroster opening 35, while air passing through the interior heat exchanger 4 is restricted from flowing toward the defroster opening 35. Therefore, it can restrict moisture evaporated on the interior heat exchanger 4 from being introduced into the defroster opening 35, and air dehumidified in the cooling heat exchanger 5 is supplied to the windshield through the defroster opening 35. Further, because air flows through the bypass passage, a pressure resistance of air generated while passing through the air conditioning case 31 can be made smaller, and air flowing amount to be blown into the passenger compartment can be increased.

When a predetermined time passes after the switching operation from the cooling operation to the heating operation, the temperature of the interior heat exchanger 4 increases, and condensed water adhering on the interior heat exchanger 4 is completely evaporated. In this case, the air guiding door 120 is operated to the solid line position, so that air passing through the interior heat exchanger 4 flows toward the defroster opening 35.

According to the eighth embodiment of the present invention, when the heating operation is switched from the cooling operation, it can restrict moisture evaporated on the surface of the interior heat exchanger 4 from being supplied toward the windshield, and air dehumidified in the cooling heat exchanger 5 can be supplied to the windshield. Therefore, it can prevent the windshield from being fogged.

In the eighth embodiment, the other parts can be made similar to those of the above-described first embodiment.

(Ninth Embodiment)

The ninth embodiment of the present invention will be now described with reference to FIG. 9. In the above-described eighth embodiment, the cooling heat exchanger 5 is disposed upstream from the interior heat exchanger 4 in the air flowing direction. However, in the ninth embodiment, the cooling heat exchanger 5 and the interior heat exchanger 4 are disposed in parallel, relative to the air flowing direction. Further, the air guiding door 120 is disposed to guide air passing through the cooling heat exchanger 5 toward the defroster opening 35.

Figure 9:
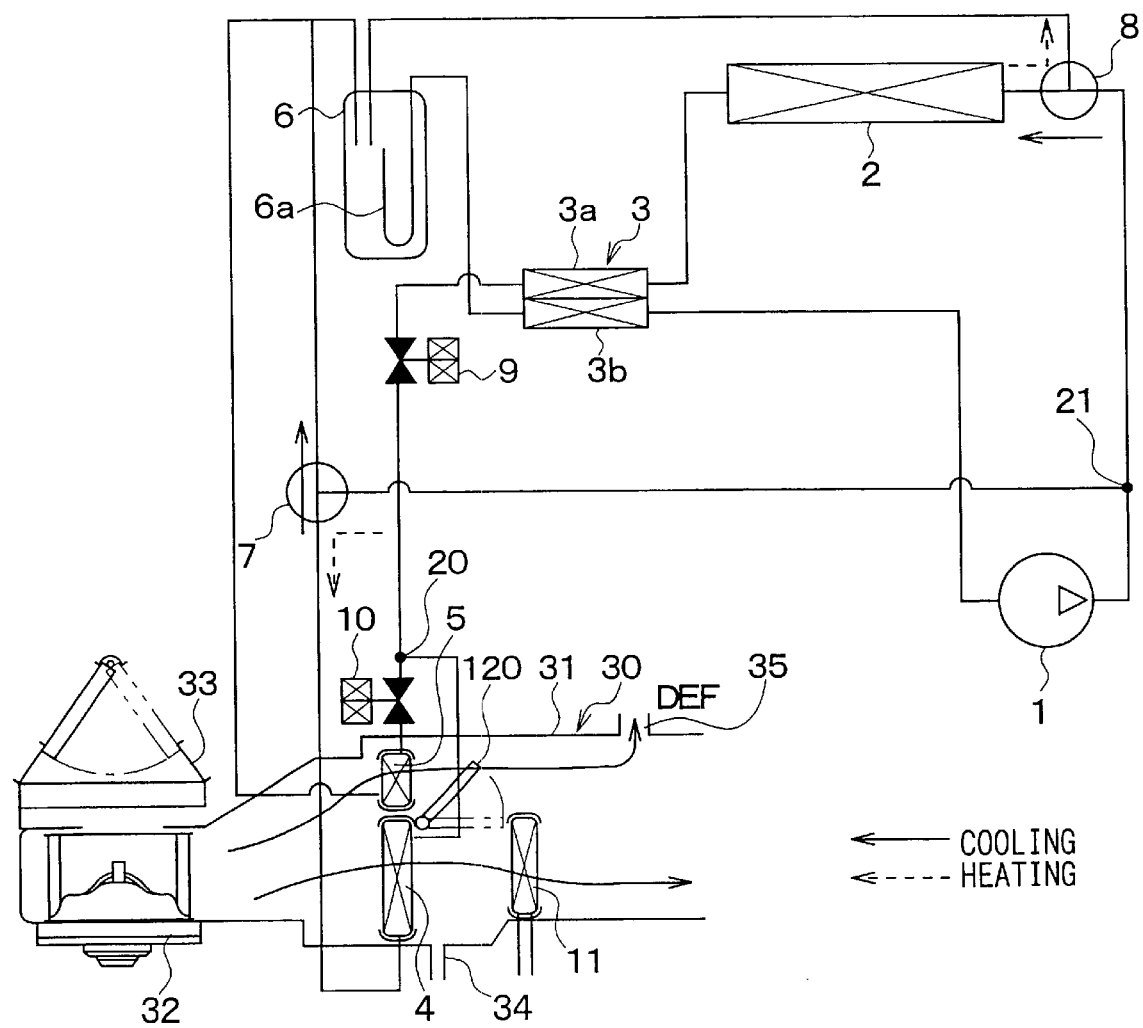
FIG. 9 is a schematic diagram showing an air conditioner with a heat pump refrigerant cycle, according to a ninth embodiment of the present invention.

Similarly to the above-described eighth embodiment, when the heating operation is switched from the cooling operation, the air guiding door 120 is operated to the chain line position in FIG. 9, so that air passing through the cooling heat exchanger 5 is introduced into the defroster opening 35. After a predetermined time passes after the switching operation from the cooling operation to the heating operation, the air guiding door 120 is operated to the solid line position in FIG. 9, so that air heated in the interior heat exchanger 4 can be supplied to the defroster opening 35. Further, in the ninth embodiment, the cooling heat exchanger 5 and the interior heat exchanger 4 are connected in parallel, in the refrigerant flow direction.

In the ninth embodiment, the other parts are similar to those of the above-described eighth embodiment, and the advantage similar to the eight embodiment can be obtained.

(Tenth Embodiment)

Figure 10:
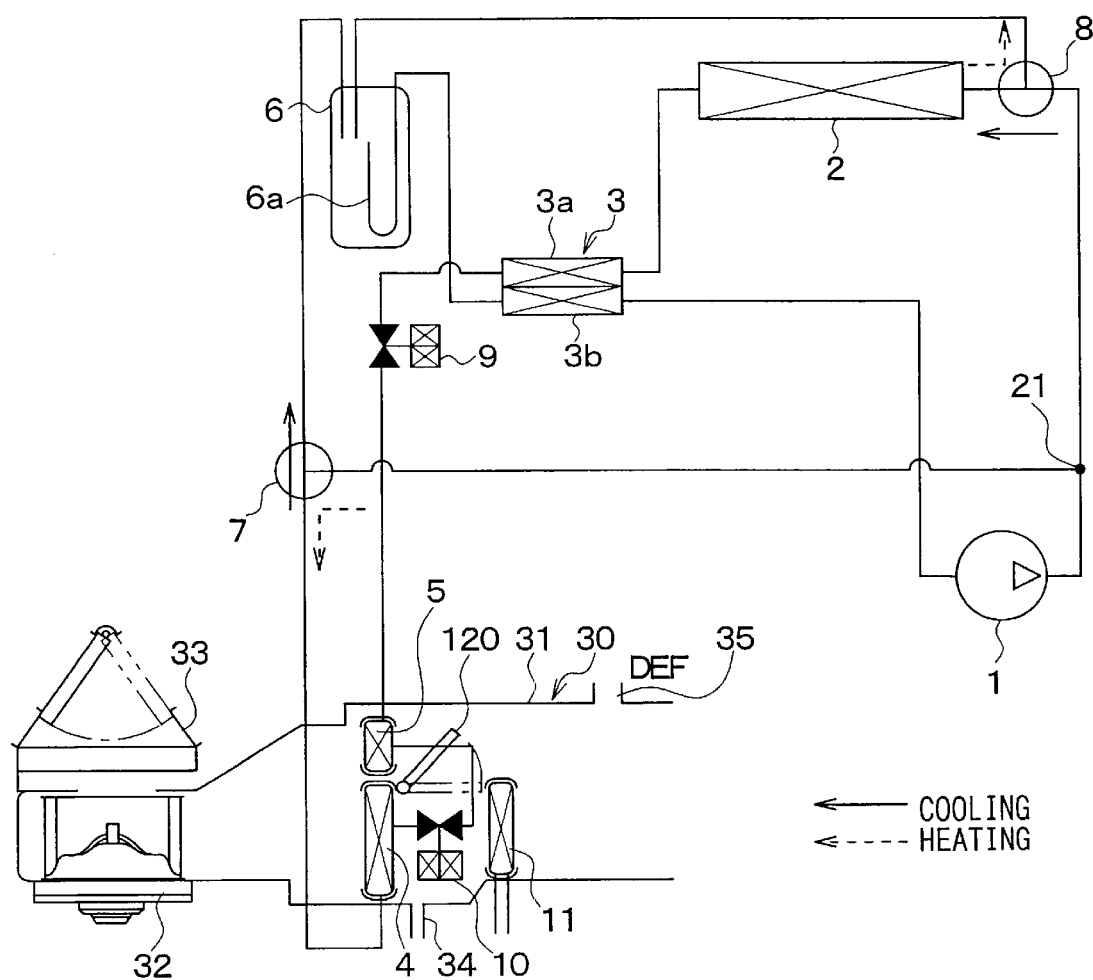
FIG. 10 is a schematic diagram showing an air conditioner with a heat pump refrigerant cycle, according to a tenth embodiment of the present invention.
Figure 11:
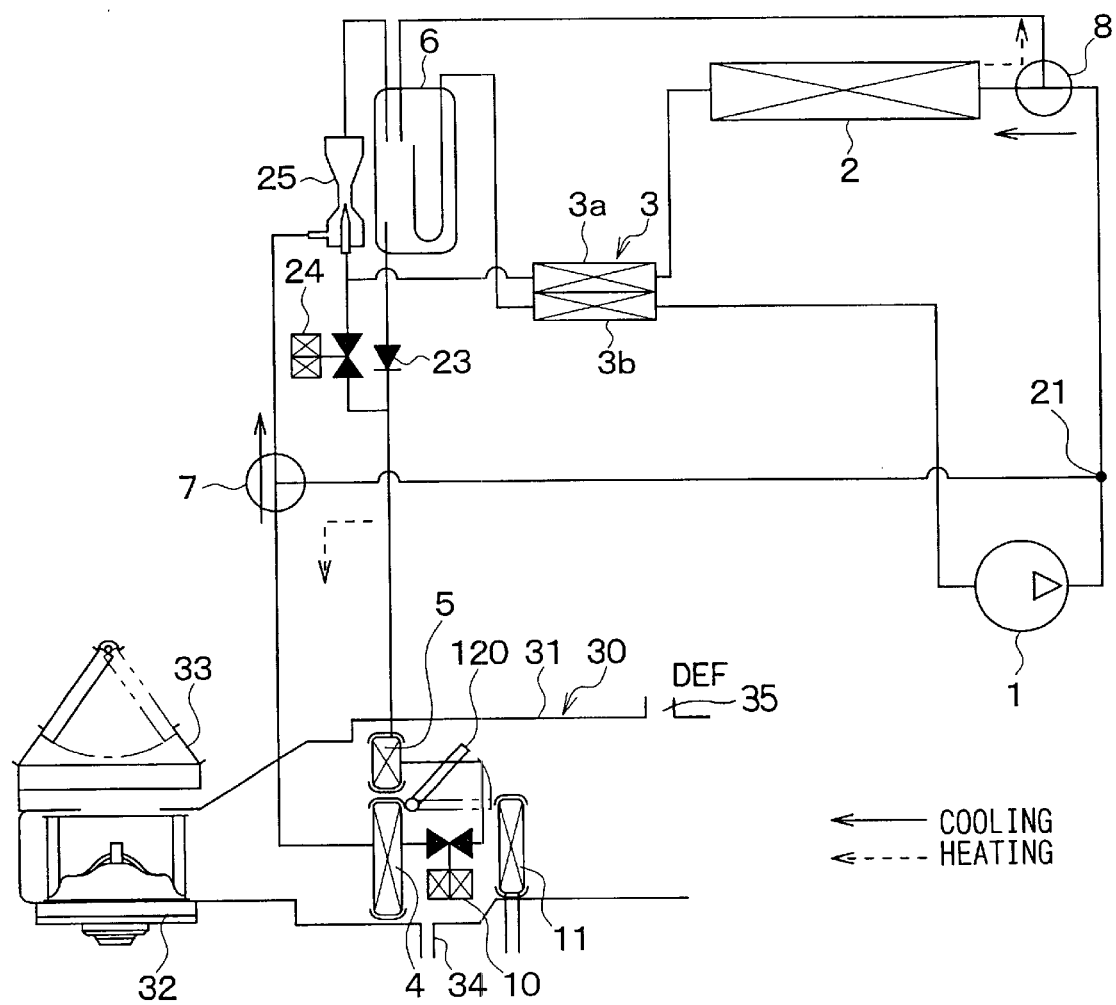
FIG. 11 is a schematic diagram showing an air conditioner with a heat pump refrigerant cycle, according to the tenth embodiment of the present invention.

In the above-described ninth embodiment, the cooling heat exchanger 5 and the interior heat exchanger 4 are connected in parallel, relative to the refrigerant flow direction. However, in the tenth embodiment, as shown in FIGS. 10 and 11, the cooling heat exchanger 5 and the interior heat exchanger 4 are connected in series, relative to the refrigerant flow direction. Specifically, FIG. 10 is an expansion refrigerant cycle system where refrigerant is decompressed in the valves 9 and 10, and FIG. 11 is an ejector cycle system where the refrigerant is decompressed by using the ejector 25. In FIGS. 10 and 11 of the tenth embodiment, the air guiding door 120 is operated similar to that in the above-described eighth and ninth embodiments, so that air passing through the cooling heat exchanger 5 can be guided toward the defroster opening 35 by the air guiding door 120.

Although the present invention has been fully described in connection with the preferred embodiments thereof with reference to the accompanying drawings, it is to be noted that various changes and modifications will become apparent to those skilled in the art.

For example, in the above-described embodiments, in the cooling operation, the valve 10 (throttle) is opened so that air is cooled by the cooling heat exchanger 5. However, in the cooling operation, the valve 10 can be closed so that cooling capacity is not obtained in the cooling heat exchanger 5 in the cooling operation.

Further, in the above-described embodiments, an expansion valve can be used as the valve 9. In this case, the opening degree of the valve 9 is adjusted so that a superheating degree at the refrigerant suction side of the compressor 1 is controlled to a predetermined degree. Further, the other decompression units such as a fixed throttle having a fixed opening degree and a capillary tube can be used as the valve 9.

In the above-described first embodiment, fluorocarbon (flon) is typically used as the refrigerant. On the other hand, in the above-described second embodiment, carbon dioxide is typically used as the refrigerant. However, in the above-described embodiments, the other fluids can be used as the refrigerant. For example, carbon dioxide can be used as the refrigerant in the first embodiment.

Such changes and modifications are to be understood as being within the scope of the present invention as defined by the appended claims.

What is claimed is:

1. An air conditioner for a compartment, comprising:
   a compressor for compressing and discharging refrigerant;
   an exterior heat exchanger for performing heat exchange with outside air outside the compartment, which radiates heat in a cooling operation and absorbs heat in a heating operation;
   an interior heat exchanger for cooling and heating air to be blown into the compartment, the interior heat exchanger being disposed such that the refrigerant discharged from the compressor flows to the interior heat exchanger after passing through the exterior heat exchanger in the cooling operation, and the refrigerant discharged from the compressor flows to the exterior heat exchanger after passing through the interior heat exchanger in the heating operation;
   a cooling heat exchanger in which the refrigerant flows for cooling air to be blown into the compartment; and
   a decompression device for decompressing the refrigerant flowing to the cooling heat exchanger,
   wherein the decompression device is opened in the cooling operation.

2. The air conditioner according to claim 1, further comprising
   an air conditioning case for defining an air passage through which air flows into the compartment,
   wherein the cooling heat exchanger is disposed in the air conditioning case upstream from the interior heat exchanger in an air flowing direction.

3. The air conditioner according to claim 1, further comprising
   an air conditioning case for defining an air passage through which air flows into the compartment,
   wherein the cooling heat exchanger and the interior heat exchanger are disposed in the air conditioning case, in parallel in an air flowing direction.

4. The air conditioner according to claim 1, wherein the cooling heat exchanger and the interior heat exchanger are disposed such that at least a part of air after passing through the cooling heat exchanger passes through the interior heat exchanger.

5. The air conditioner according to claim 1, further comprising
   an air conditioning case for defining an air passage through which air flows into the compartment; and
   a heater core for heating air in the air passage using a fluid flowing in the heater core as a heating source,
   wherein the heater core is disposed in the air conditioning case downstream from the cooling heat exchanger and the interior heat exchanger in an air flowing direction.

6. The air conditioner according to claim 1, further comprising
   an air conditioning case for defining an air passage through which air flows into the compartment, wherein:
   the interior heat exchanger is disposed in the air conditioning case; and
   the air conditioning case has a discharge passage, at a position immediately downstream from the interior heat exchanger, through which at least a part of air passing through the interior heat exchanger is discharged to an outside of the air conditioning case.

7. The air conditioner according to claim 6, further comprising
   a switching door disposed for opening and closing the discharge passage.

8. The air conditioner according to claim 1, wherein the cooling heat exchanger has a dimension in an air flowing direction, which is smaller than that of the interior heat exchanger.

9. The air conditioner according to claim 1, wherein the cooling heat exchanger has an air inlet surface for introducing air in an air flowing direction, which is smaller than that of the interior heat exchanger.

10. The air conditioner according to claim 1, wherein:
    each of the cooling heat exchanger and the interior heat exchanger includes a plurality of tubes through which refrigerant flow, and a plurality of corrugated fins each of which is disposed between adjacent tubes; and a fin pitch of the corrugated fins in the cooling heat exchanger is larger than that in the interior heat exchanger.

11. The air conditioner according to claim 1, wherein:
each of the cooling heat exchanger and the interior heat exchanger includes a plurality of tubes through which refrigerant flow, and a plurality of corrugated fins each of which is disposed between adjacent tubes; and
a fin height of the corrugated fins in the cooling heat exchanger is higher than that in the interior heat exchanger.

12. The air conditioner according to claim 1, wherein the cooling heat exchanger is coupled to the interior heat exchanger such that at least a part of refrigerant flowing out from the interior heat exchanger is introduced to the cooling heat exchanger.

13. The air conditioner according to claim 1, wherein the cooling heat exchanger is coupled to the interior heat exchanger such that refrigerant flowing to the cooling heat exchanger is branched from the interior heat exchanger.

14. The air conditioner according to claim 1, wherein the decompression unit is a throttle member that is disposed upstream from the cooling heat exchanger in a refrigerant flow direction to decompress the refrigerant flowing to the cooling heat exchanger.

15. The air conditioner according to claim 1, further comprising
a control valve that is disposed to decompress refrigerant flowing from the interior heat exchanger in the heating operation, and to decompress refrigerant flowing toward the interior heat exchanger in the cooling operation.

16. The air conditioner according to claim 1, wherein the refrigerant is carbon dioxide.

17. The air conditioner according to claim 1, further comprising:
a control valve for controlling a pressure of a high-pressure side refrigerant discharged from the compressor and before being decompressed; and
a temperature detecting unit for detecting a temperature of the high-pressure side refrigerant,
wherein the control valve controls the pressure of the high-pressure side refrigerant based on the temperature of the high-pressure side refrigerant.

18. The air conditioner according to claim 1, further comprising
an ejector which decompresses refrigerant discharged from the compressor in the cooling operation.

19. The air conditioner according to claim 18, further comprising
a control valve for decompressing refrigerant in the heating operation, wherein the control valve controls a pressure of a high-pressure side refrigerant discharged from the compressor based on a temperature of the high-pressure side refrigerant.

20. The air conditioner according to claim 18, further comprising
a fixed throttle for decompressing refrigerant in the heating operation.

21. The air conditioner according to claim 18, wherein the decompression device is a fixed throttle that decompresses refrigerant to be introduced to the cooling heat exchanger.

22. The air conditioner according to claim 1, further comprising:
an air conditioning case for defining an air passage through which air flows into the passenger compartment, the air conditioning having an opening through which air is blown toward a predetermined position in the compartment; and
an air guiding member, disposed in the air conditioning case, for guiding air after passing through the cooling heat exchanger to the air opening.

23. The air conditioner according to claim 22, wherein the air guiding member guides at least a part of air passing through the cooling heat exchanger to the air opening, when the heating operation is switched from the cooling operation.

24. The air conditioner according to claim 22, wherein the air guiding member guides at least a part of air passing through the cooling heat exchanger to the air opening, after a predetermined time passes after the heating operation is switched from the cooling operation.

25. The air conditioner according to claim 1, further comprising
an inner heat exchanger for performing a heat exchange between a high-pressure side refrigerant before being decompressed, and a low-pressure side refrigerant after being decompressed.

26. The air conditioner according to claim 25, wherein:
the inner heat exchanger has therein a first refrigerant passage through which the high-pressure side refrigerant flows, and a second refrigerant passage through which the low-pressure side refrigerant flows; and
the first refrigerant passage has a passage diameter that is substantially equal to a passage diameter of the second refrigerant passage.

27. The air conditioner according to claim 25, wherein:
the inner heat exchanger has therein a first refrigerant passage through which the high-pressure side refrigerant flows, and a second refrigerant passage through which the low-pressure side refrigerant flows; and
the first refrigerant passage has an equivalent passage diameter that is substantially equal to that of the second refrigerant passage.

28. An air conditioner for a vehicle having a passenger compartment, comprising:
an air conditioning case for defining an air passage through which air flows into the passenger compartment;
a compressor for compressing and discharging refrigerant;
an exterior heat exchanger, disposed outside the air conditioning case, for performing heat exchange with outside air outside the air conditioning case;
an interior heat exchanger, disposed in the air conditioning case, for cooling and heating air to be blown into the compartment, the interior heat exchanger being disposed such that the refrigerant discharged from the compressor flows to the interior heat exchanger after passing through the exterior heat exchanger in a cooling operation for cooling the passenger compartment, and the refrigerant discharged from the compressor flows to the exterior heat exchanger after passing through the interior heat exchanger in a heating operation for heating the passenger compartment; and
a cooling heat exchanger in which the refrigerant flows for cooling air flowing through the air passage, wherein:
in the heating operation, the interior heat exchanger heats air flowing through the air passage by radiating heat from the refrigerant, and the cooling heat exchanger cools air flowing through the air passage by evaporating the refrigerant; and in the cooling operation, at least the interior heat exchanger cools air flowing through the air passage by evaporating the refrigerant.

29. The air conditioner according to claim 28, further comprising a decompression unit which decompresses refrigerant flowing into the cooling heat exchanger, in the cooling operation, the decompression unit is opened so that refrigerant flows through the cooling heat exchanger.

30. The air conditioner according to claim 29, further comprising a control valve for decompressing refrigerant flowing from the interior heat exchanger in the heating operation, and for decompressing refrigerant flowing into the interior heat exchanger in the cooling operation.

31. The air conditioner according to claim 28, wherein the air conditioning case has a defroster opening through which air is blown toward a windshield of the vehicle, the air conditioner further comprising an air guiding member that guides air after passing through the cooling heat exchanger toward the defroster opening when the heating operation is switched from the cooling operation.

* * * * *